United States Patent
Lee et al.

(10) Patent No.: US 11,095,394 B2
(45) Date of Patent: Aug. 17, 2021

(54) METHOD BY WHICH TERMINAL BLIND-DECODES PHYSICAL SIDELINK CONTROL CHANNEL (PSCCH) IN WIRELESS COMMUNICATION SYSTEM, AND TERMINAL USING SAME

(71) Applicant: LG ELECTRONICS INC., Seoul (KR)

(72) Inventors: Seungmin Lee, Seoul (KR); Hanbyul Seo, Seoul (KR); Myoungseob Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 104 days.

(21) Appl. No.: 16/610,415

(22) PCT Filed: May 2, 2018

(86) PCT No.: PCT/KR2018/005108
§ 371 (c)(1),
(2) Date: Nov. 1, 2019

(87) PCT Pub. No.: WO2018/203671
PCT Pub. Date: Nov. 8, 2018

(65) Prior Publication Data
US 2021/0167890 A1    Jun. 3, 2021

Related U.S. Application Data

(60) Provisional application No. 62/500,492, filed on May 2, 2017.

(51) Int. Cl.
*H04J 3/00* (2006.01)
*H04L 1/00* (2006.01)
(Continued)

(52) U.S. Cl.
CPC .......... *H04L 1/0038* (2013.01); *H04L 5/0094* (2013.01); *H04W 72/0406* (2013.01); *H04W 72/1278* (2013.01)

(58) Field of Classification Search
CPC . H04L 1/0038; H04L 5/0094; H04L 72/1278; H04L 72/0406
(Continued)

(56) References Cited

U.S. PATENT DOCUMENTS 10,721,027 B2 * 7/2020 Baghel ................ H04L 5/0055
2016/0323866 A1   11/2016 Yamada et al.
(Continued)

OTHER PUBLICATIONS

European Patent Office Application Serial No. 18794777.5, Search Report dated Mar. 12, 2020, 9 pages.
(Continued)

*Primary Examiner* — Thai D Hoang
(74) *Attorney, Agent, or Firm* — Lee, Hong, Degerman, Kang & Waimey PC

(57) ABSTRACT

A method by which a terminal blind-decodes a PSCCH in a wireless communication system is proposed. The method comprises: receiving a blind decoding configuration from a network; and performing blind decoding in a first TTI on the basis of the configuration, wherein the blind decoding includes: first blind decoding on a first PSCCH on the basis of the first TTI; and second blind decoding on a second PSCCH on the basis of a second TTI shorter than the first TTI, and the configuration controls the number of times of the first blind decoding and/or the number of times of the second blind decoding to be performed by the terminal in the first TTI.

17 Claims, 16 Drawing Sheets

(51) Int. Cl.
*H04W 72/12* (2009.01)
*H04W 72/04* (2009.01)
*H04L 5/00* (2006.01)

(58) Field of Classification Search
USPC ........ 370/329–330, 336, 337, 347–348, 436, 370/442
See application file for complete search history.

(56) References Cited

U.S. PATENT DOCUMENTS

2016/0345312 A1   11/2016  Kim et al.
2020/0107351 A1*  4/2020   Lee ................... H04W 72/0446
2020/0275458 A1*  8/2020   Khoryaev ............... H04W 4/44

OTHER PUBLICATIONS

Mediatek, "Channel design for shortened TTI in FDD", 3GPP TSG RAN WG1 Meeting #84bis, R1-162945, Apr. 2016, 6 pages.
ZTE, "Downlink control channels for short TTI", 3GPP TSG RAN WG1 Meeting #84, R1-160983, Feb. 2016, 5 pages.
PCT International Application No. PCT/KR2018/005108, International Search Report dated Aug. 9, 2018, 6 pages.
Intel, "LTE V2V Demodulation Requirements: Single-link test cases", 3GPP TSG RAN WG4 Meeting #82bis, R4-1702920, Apr. 2017, 11 pages.
Intel, "Discussion on V2V demodulation performance requirements", 3GPP TSG RAN WG4 Meeting #82, R4-1700551, Feb. 2017, 8 pages.
Intel, "On PSSCH DMRS Signal Generation and Performance Analysis", 3GPP TSG RAN WG1 Meeting #88, R1-1702138, Feb. 2017, 7 pages.

* cited by examiner

FIG. 10
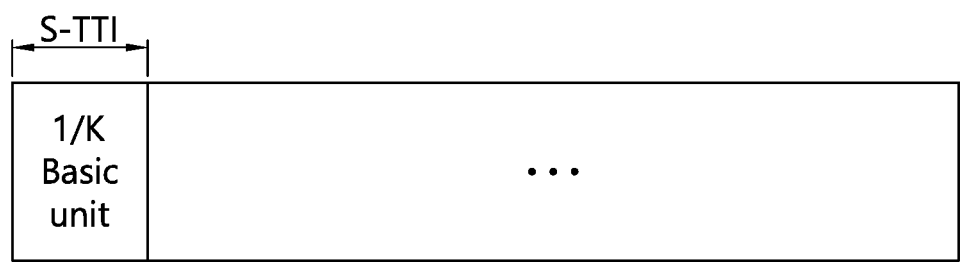
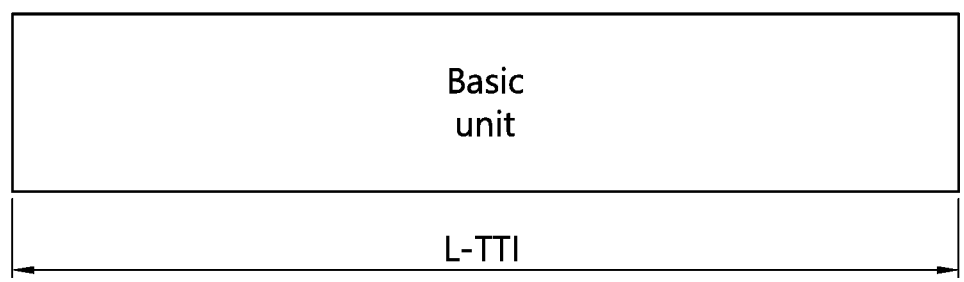

METHOD BY WHICH TERMINAL BLIND-DECODES PHYSICAL SIDELINK CONTROL CHANNEL (PSCCH) IN WIRELESS COMMUNICATION SYSTEM, AND TERMINAL USING SAME

CROSS-REFERENCE TO RELATED APPLICATIONS

This application is the National Stage filing under 35 U.S.C. 371 of International Application No. PCT/KR2018/005108, filed on May 2, 2018, which claims the benefit of U.S. Provisional Application No. 62/500,492, filed on May 2, 2017, the contents of which are all hereby incorporated by reference herein in their entirety.

BACKGROUNDS

Field of the Disclosure

The disclosure relates to wireless communication and, more particularly, to a method in which a user equipment (UE) performs blind decoding of a PSCCH in a wireless communication system and a UE using the same.

Related Art

The International Telecommunication Union Radio communication sector (ITU-R) is working on the standardization of International Mobile Telecommunication (IMT)-Advanced, the next generation of mobile communication systems after the third generation. IMT-Advanced aims to support Internet Protocol (IP)-based multimedia services at data rates of 1 Gbps in stationary and slow motions and 100 Mbps in high speeds.

$3^{rd}$ Generation Partnership Project (3GPP) is preparing LTE-Advanced (LTE-A), which is an improvement of Long Term Evolution (LTE) based on Orthogonal Frequency Division Multiple Access (OFDMA)/Single Carrier-Frequency Division Multiple Access (SC-FDMA) transmission scheme, as a system standard that meets the requirements of IMT-Advanced. LTE-A is one of the potential candidates for IMT-Advanced.

Recently, interest in Device-to-Device (D2D) technology for direct communication between devices is increasing. In particular, D2D is drawing attention as a communication technology for a public safety network. Commercial communication networks are rapidly changing to LTE, but current public safety networks are mainly based on 2G technology in terms of cost and conflict with existing communication standards. This gap in technology and the need for improved services have led to efforts to improve public safety networks.

In a next-generation wireless communication system, in a V2X resource pool in which a UE performing a relatively long TTI-based V2X operation and a UE performing a relatively short TTI-based V2X operation coexist, there may be a case where a UE needs to perform blind decoding on a relatively long TTI-based PSCCH and a relatively short TTI-based PSCCH at the same time. Here, for example, the maximum number of times the UE can perform blind decoding within a time period of one relatively long TTI or the maximum number of PSCCHs that the UE can decode within a time period of one relatively long TTI may be determined on the basis of a capability of the UE. In this case, a method for properly dividing the number of blind decoding times for each of an L-TTI-based PSCCH and an S-TTI-based PSCCH is required for the efficient coexistence of the UEs in the resource pool in which the UEs coexist. Therefore, the disclosure proposes a method for effectively adjusting or dividing the number of blind decoding times for a relatively long TTI-based PSCCH and a relatively short TTI-based PSCCH.

SUMMARY

An aspect of the disclosure is to provide a method in which a user equipment (UE) performs blind decoding of a PSCCH in a wireless communication system and a UE using the same.

In one aspect, a method in which a user equipment (UE) performs blind decoding of a physical sidelink control channel (PSCCH) in a wireless communication system is provided. The method is comprising receiving a blind decoding configuration from a network, and performing blind decoding in a first transmission time interval (TTI) based on the configuration, wherein the blind decoding comprises first blind decoding for a first PSCCH based on the first TTI and second blind decoding for a second PSCCH based on a second TTI shorter than the first TTI, and the configuration is used to control at least one of a number of times the UE performs the first blind decoding in the first TTI and a number of times the UE performs the second blind decoding in the first TTI.

In a resource pool configured for the UE, a first UE performing a sidelink operation based on the first TTI and a second UE performing a sidelink operation based on the second TTI may coexist.

The configuration may inform a minimum number of times the UE performs the second blind decoding.

The configuration may be resource pool-specific.

The UE may have a restricted blind decoding capability.

The configuration may inform a division ratio between a number of times the UE performs the first blind decoding and a number of times the UE performs the second blind decoding.

The blind decoding may be performed on a first carrier, and the blind decoding is performed by adding a number of blind decoding times that can be performed on a second carrier.

The added number may be controlled by the network.

The added number may be a remaining number of blind decoding times related to a number of blind decoding times allocated for the second carrier excluding a number of blind decoding times required in a resource pool for the second carrier.

The number of blind decoding times allocated for the second carrier may be greater than the number of blind decoding times required in the resource pool for the second carrier.

A number of carriers simultaneously monitored by the UE may be determined based on the added number.

The UE may transmit capability information about the blind decoding to the network.

The configuration may be set based on the capability information.

The capability information may comprise a maximum number of times the UE can perform the blind decoding on a plurality of carriers within the first TTI.

The configuration may be set differently according to at least one of a congestion level, a carrier priority, or a UE type.

In another aspect, provided is a user equipment (UE) comprising a transceiver configured to transmit and receive a radio signal, and a processor configured to be connected with the transceiver and to operate, wherein the processor is configured to receive a blind decoding configuration from a network, and perform blind decoding in a first transmission time interval (TTI) based on the configuration, the blind decoding comprises first blind decoding for a first PSCCH based on the first TTI and second blind decoding for a second PSCCH based on a second TTI shorter than the first TTI, and the configuration is used to control at least one of a number of times the UE performs the first blind decoding in the first TTI and a number of times the UE performs the second blind decoding in the first TTI.

It is possible for a UE to perform effective PSCCH decoding in a resource pool in which a UE performing an operation based on a TTI having a length of 1 ms and a UE performing an operation based on a TTI having a length shorter than 1 ms coexist and it is possible to guarantee the efficient coexistence of the UEs in the resource pool. This is effective particularly for a UE having a restricted blind decoding capability. Further, compared to a conventional case where a UE performs blind decoding in a resource pool in which only UEs performing an operation based on a TTI of 1 ms exist, it is possible to mitigate an increase in complexity of implementation of a UE performing blind decoding in the resource pool in which the UEs coexist.

BRIEF DESCRIPTION OF THE DRAWINGS

FIG. 10 schematically illustrates another example of an S-TTI and an L-TTI.

DESCRIPTION OF EXEMPLARY EMBODIMENTS

Terms and abbreviations therefor to be used herein may be defined in the 3GPP TS 36 series standards unless specified otherwise.

Figure 1:
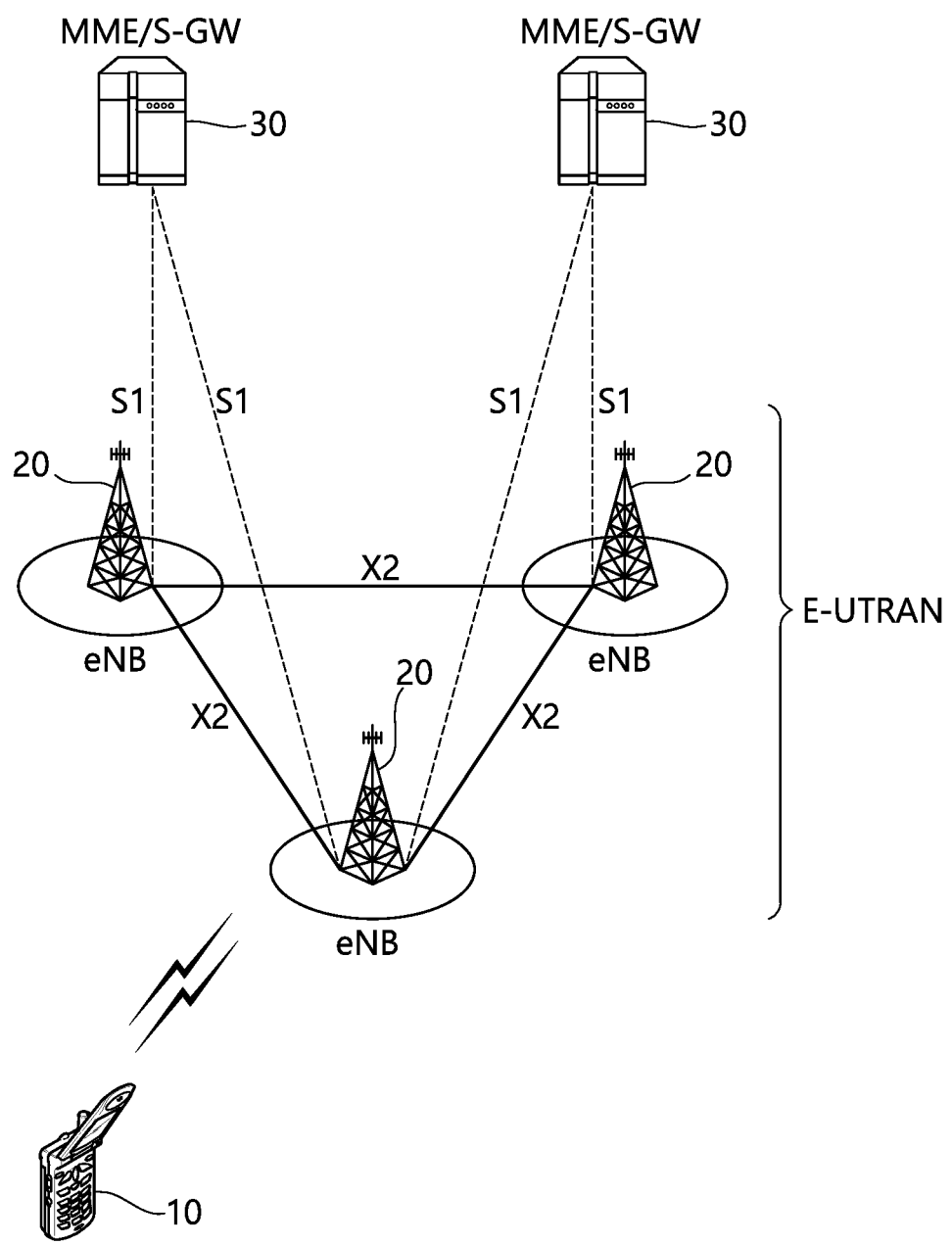
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
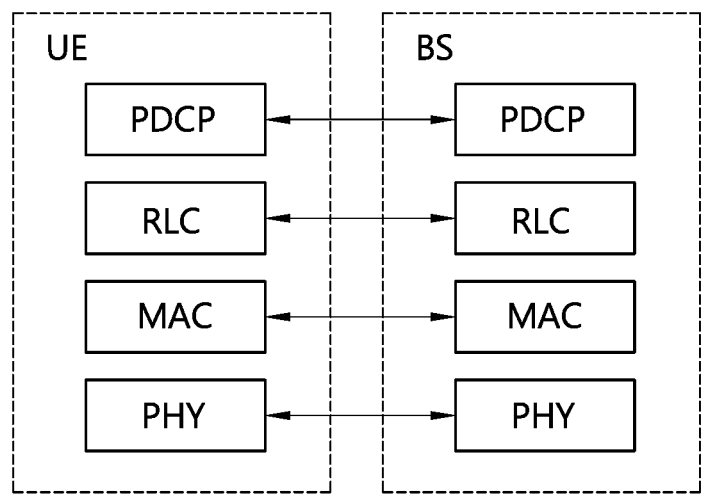
FIG. 2 is a diagram showing a wireless protocol architecture for a user plane.
Figure 3:
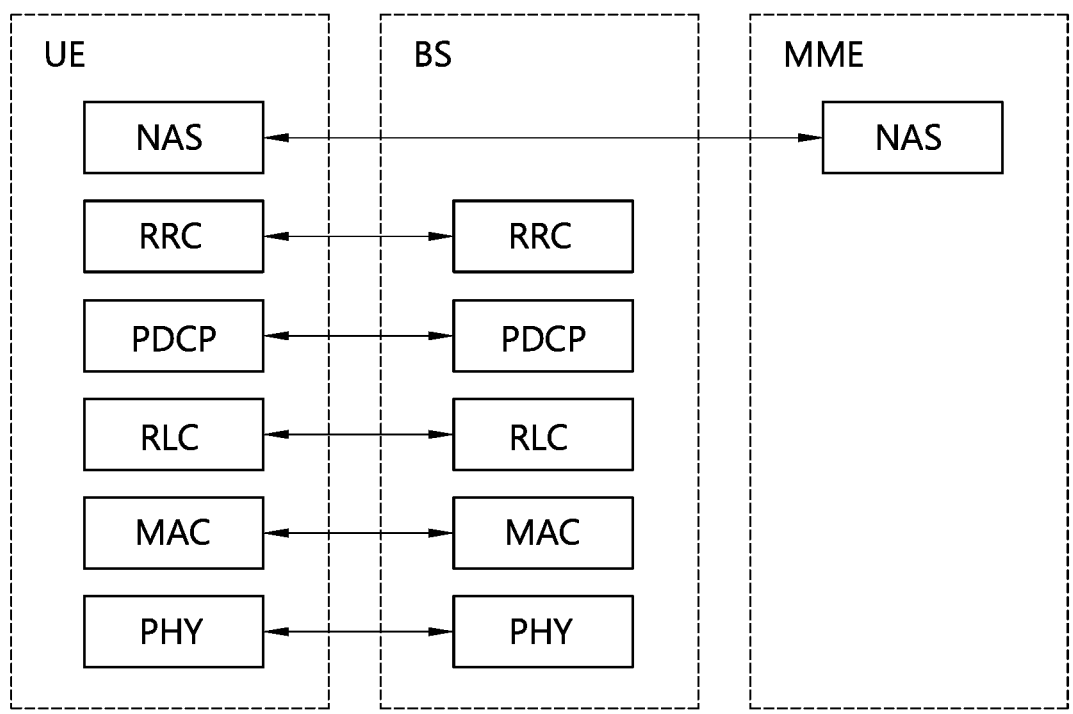
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

In what follows, a new radio access technology (RAT) will be described. The new radio access technology may also be called a new radio for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present disclosure.

Figure 4:
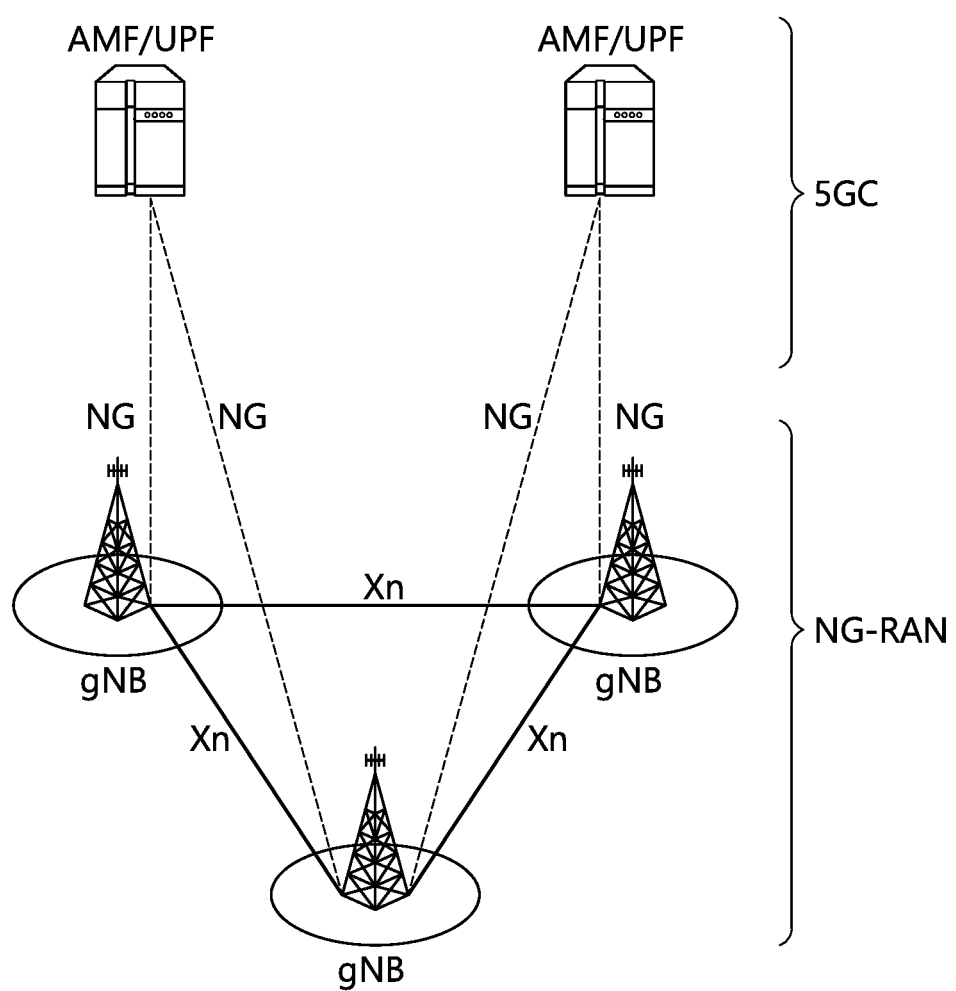
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
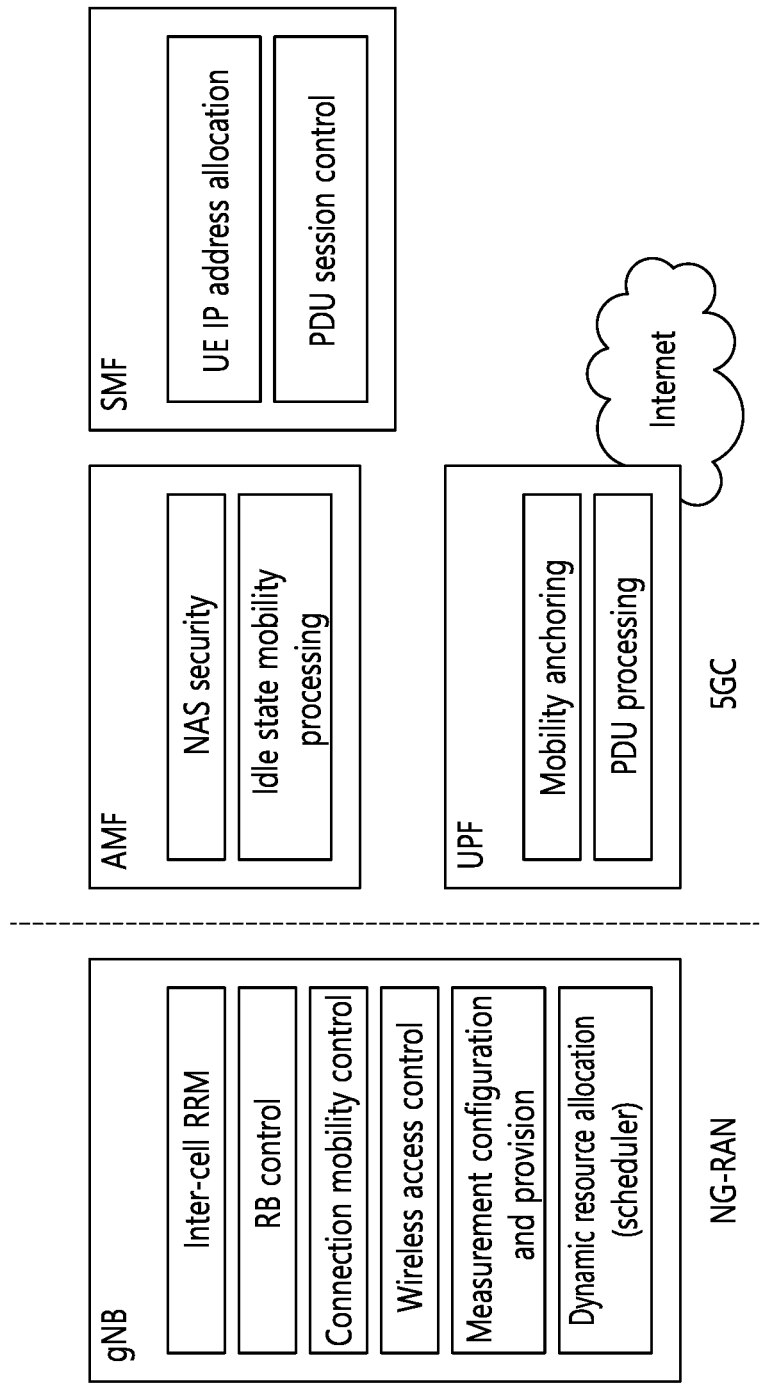
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

Figure 6:
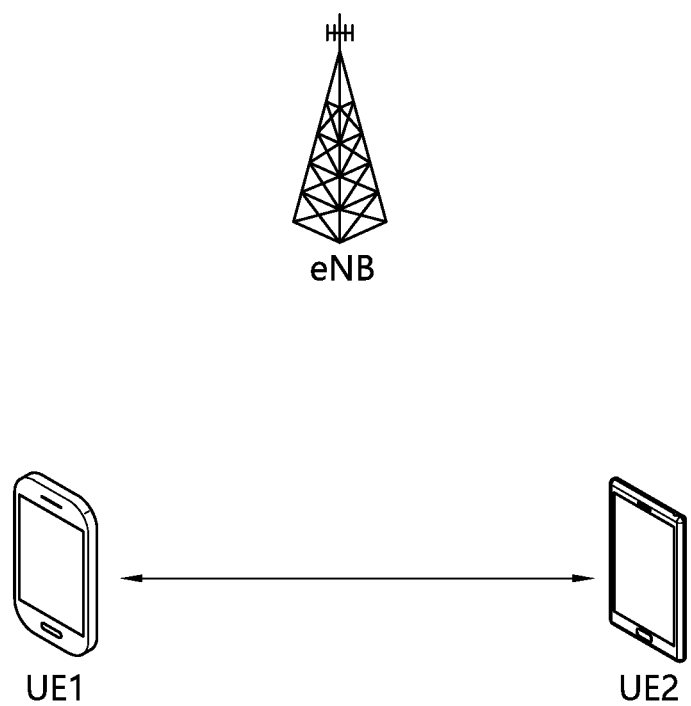
FIG. 6 illustrates UEs performing V2X or D2D communication.

FIG. 6 illustrates UEs performing V2X or D2D communication.

Referring to FIG. 6, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

Figure 7:
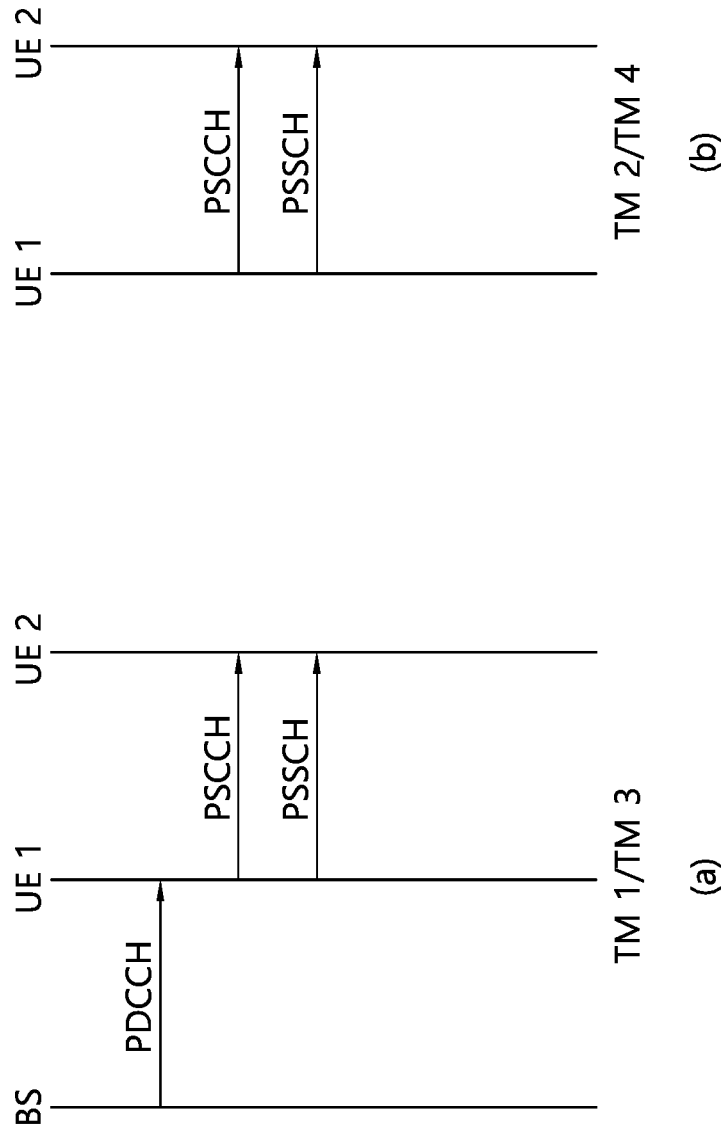
FIG. 7 illustrates a UE operation according to the transmission mode (TM) related to V2X/D2D communication.

FIG. 7 illustrates a UE operation according to the transmission mode (TM) related to V2X/D2D communication.

FIG. 7(a) is related to transmission mode 1, 3 while FIG. 7(b) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

The SCI format 0 may be used for the transmission mode 1, 2 while the SCI format 1 may be used for the transmission mode 3, 4.

Figure 8:
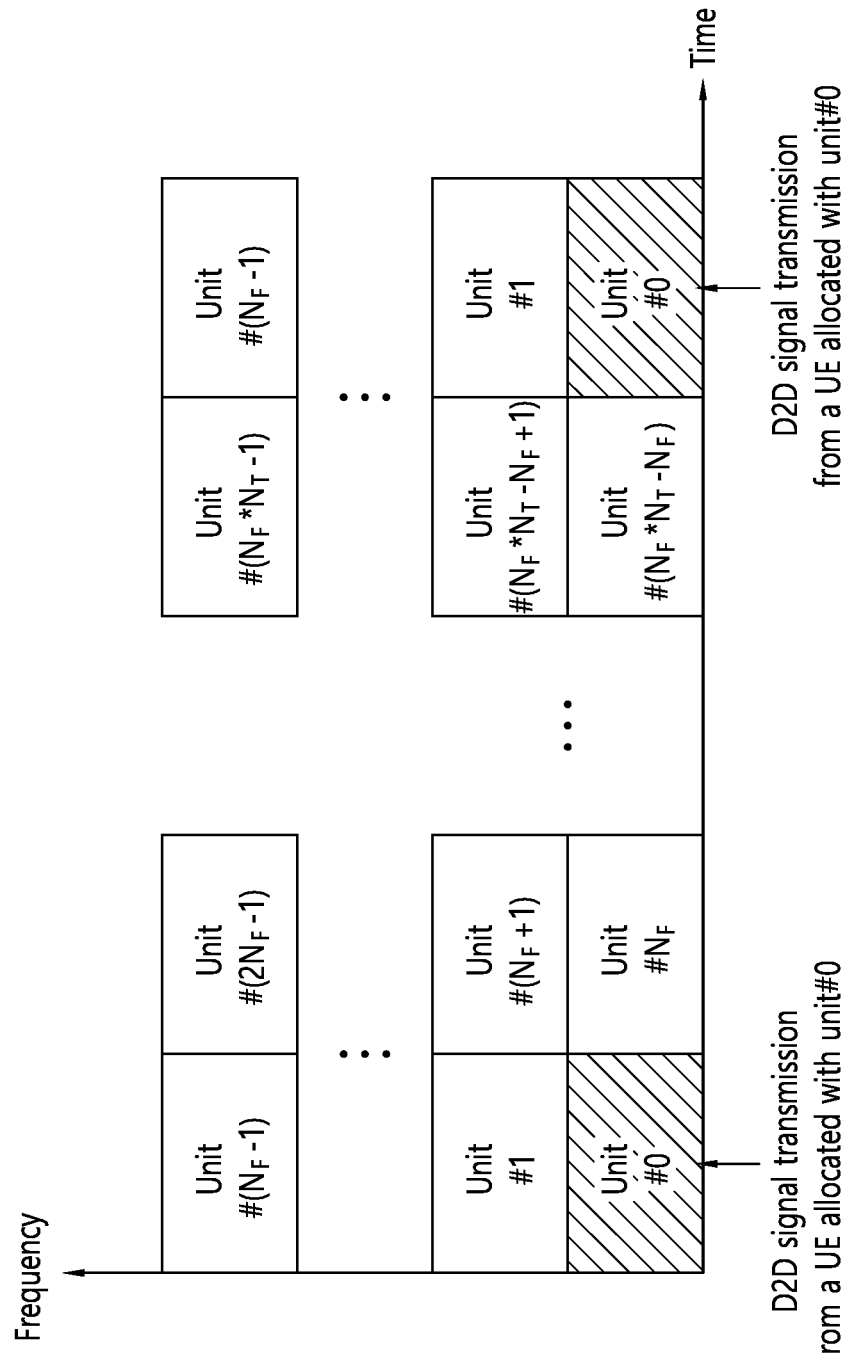
FIG. 8 illustrates an example of a configuration of resource units.

FIG. 8 illustrates an example of a configuration of resource units.

Referring to FIG. 8, the entire frequency resources of a resource pool may be divided into $N_F$ units, and the entire time resources of the resource pool may be divided into $N_T$ units, by which a total of $N_F \cdot N_T$ resource units may be defined within the resource pool.

At this time, it is assumed that the corresponding resource pool is repeated with a period of $N_T$ subframes.

As shown in FIG. 8, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

Hereinafter, a transmission time interval (TTI) in a future wireless communication system will be described in detail.

In a future wireless communication system, a variable TTI (channel/signal) may be introduced in view of traffic (or data) according to various requirements in transmission coverage/reliability/latency. For example, after a basic resource unit is defined (/configured) in advance, a TTI (for channel/signal transmission associated with data according to a specific requirement) may be defined as a single basic resource unit or a combination of a plurality of basic resource units. An example of each TTI will be described with reference to a drawing. Here, an S-TTI and an L-TTI may refer to a relatively short TTI and a relatively long TTI, respectively. An L-TTI may also refer to an existing (legacy) TTI.

Figure 9:
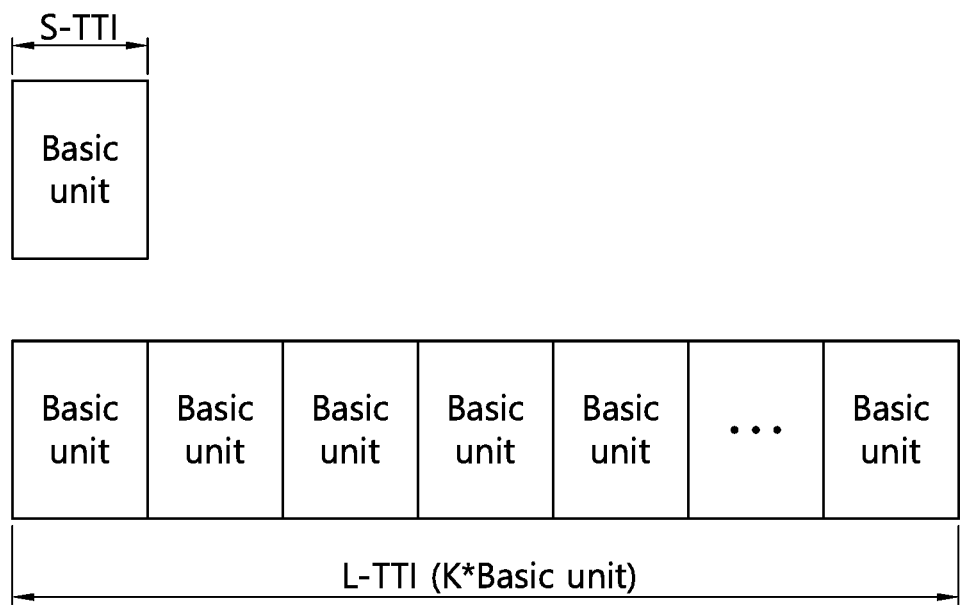
FIG. 9 schematically illustrates an example of an S-TTI and an L-TTI.

FIG. 9 schematically illustrates an example of an S-TTI and an L-TTI.

According to FIG. 9, when an S-TTI is defined as a preset (signaled) basic resource unit, an L-TTI may be construed as a combination of K (preset/signaled)S-TTIs (basic resource units).

FIG. 10 schematically illustrates another example of an S-TTI and an L-TTI.

According to FIG. 10, when an L-TTI is defined as a preset (signaled) basic resource unit, an S-TTI may be construed as one (e.g., a mini-basic resource unit) of (preset/signaled) K segments into which the L-TTI (basic resource unit) is divided.

Unlike the example illustrated in FIG. 10, an S-TTI may also be a combination of a plurality of (preset (signaled)) basic resource units.

Figure 11:
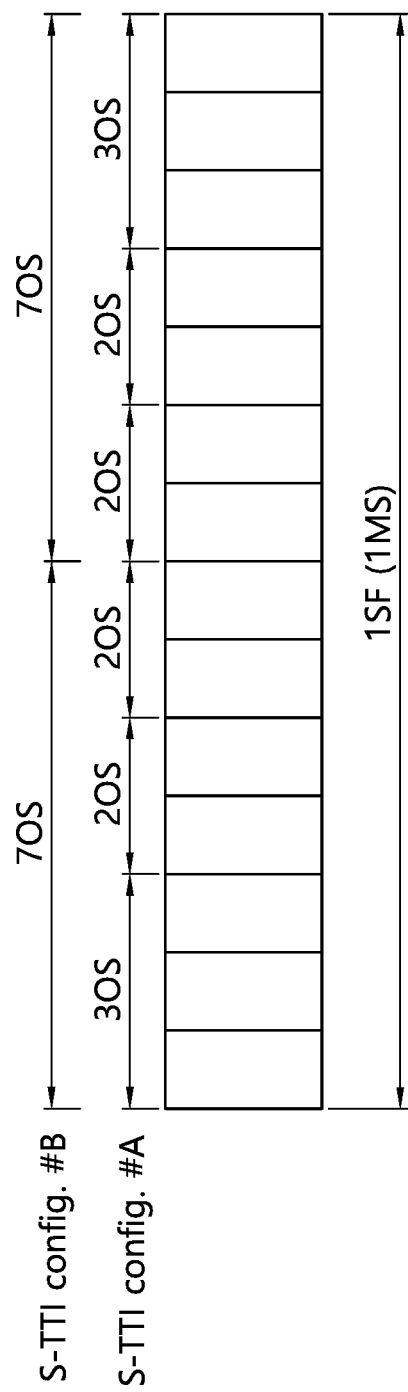
FIG. 11 schematically illustrates still another example of an S-TTI and an L-TTI.

FIG. 11 schematically illustrates still another example of an S-TTI and an L-TTI.

Referring to FIG. 11, for example, in S-TTI configuration #A, a first S-TTI may have a length of three OFDM symbols (OS), a second S-TTI may have a length of two OFDM symbols, a third S-TTI may have a length of two OFDM symbols, a fourth S-TTI may have a length of two OFDM symbols, a fifth S-TTI may have a length of two OFDM symbols, and a sixth S-TTI may have a length of three OFDM symbols.

Alternatively, in S-TTI configuration #B, a first S-TTI may have a length of seven OFDM symbols, and a second S-TTI may have a length of seven OFDM symbols.

Various examples of the relationship between an S-TTI and an L-TTI have been illustrated. However, the foregoing examples of S-TTIs and L-TTIs are illustrated merely for convenience of description, and S-TTI and L-TTI types are not limited to the foregoing examples.

Hereinafter, the sidelink RSSI (Sidelink Received Signal Strength Indicator; S-RSSI), PSSCH Reference Signal Received Power (PSSCH-RSRP), Channel Busy Rate (CHANNEL BUSY RATIO; CBR), Channel Occupancy Rate (CHANNEL OCCUPANCY RATIO (CR) will be described.

<S-RSSI>

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Herein, the reference point for the S-RSSI may be the antenna connector of the UE.

If receiver diversity is in use by the UE, the reported value may not be lower than the corresponding S-RSSI of any of the individual diversity branches.

S-RSSI is applicable for RRC_IDLE intra-frequency, RRC_IDLE inter-frequency, RRC_CONNECTED intra-frequency, and/or RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Herein, the reference point for the PSSCH-RSRP may be the antenna connector of the UE.

If receiver diversity is in use by the UE, the reported value may not be lower than the corresponding PSSCH-RSRP of any of the individual diversity branches.

PSSCH-RSRP is applicable for RRC_IDLE intra-frequency, RRC_IDLE inter-frequency, RRC_CONNECTED intra-frequency, and/or RRC_CONNECTED inter-frequency.

Herein, the power per resource element may be determined from the energy received during the useful part of the symbol, excluding the CP.

<CBR>

Channel busy ratio (CBR) measured in subframe n is defined as follows.

For PSSCH, CBR may be the portion of sub-channels in the resource pool whose S-RSSI measured by the UE exceed a (pre-)configured threshold sensed over subframes [n−100, n−1].

For PSCCH, in a pool (pre)configured such that PSCCH may be transmitted with its corresponding PSSCH in non-adjacent resource blocks, CBR may be the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

CBR is applicable for RRC_IDLE intra-frequency, RRC_IDLE inter-frequency, RRC_CONNECTED intra-frequency, and/or RRC_CONNECTED inter-frequency.

Herein, the subframe index may be based on physical subframe index.

<CR>

Channel occupancy ratio (CR) evaluated at subframe n may be defined as follows.

CR may be the total number of sub-channels used for its transmissions in subframes [n−a, n−1] and granted in subframes [n, n+b] divided by the total number of configured sub-channels in the transmission pool over [n−a, n+b].

CR is applicable for RRC_IDLE intra-frequency, RRC_IDLE inter-frequency, RRC_CONNECTED intra-frequency, and/or RRC_CONNECTED inter-frequency.

Herein, a may be a positive integer and b may be 0 or a positive integer. a and b may be determined by UE implementation with a+b+1=1000, a >=500, and n+b should not exceed the last transmission opportunity of the grant for the current transmission.

Herein, CR may be evaluated for each (re)transmission.

Herein, in evaluating CR, the UE may assume the transmission parameter used at subframe n is reused according to the existing grant(s) in subframes [n+1, n+b] without packet dropping.

Herein, the subframe index may be based on physical subframe index.

Hereinafter, the disclosure will be described in detail.

For example, proposed below are methods for a V2X UE having a restricted (PSCCH/PSSCH) decoding capability to efficiently divide/manage the decoding capability for V2X message reception (/transmission) based on an S-TTI (shorter than an existing TTI, e.g., 1 millisecond (ms)) and for V2X message reception (/transmission) based on an L-TTI (e.g., 1 ms). Here, for example, V2X communication modes may (generally) be classified into: (A) a mode (MODE #3) in which a base station configures (/signals) scheduling information related to V2X message transmission (/reception) (in a V2X resource pool configured (/signaled) in advance (by the base station (/network))) (e.g., mainly for a UE located within the communication coverage of the base station (and/or in the RRC_CONNECTED state)); and/or (B) a mode (MODE #4) in which a UE (autonomously) determines (/controls) scheduling information related to V2X message transmission (/reception) (in a V2X resource pool configured (/signaled) in advance (by a base station (/network))) (e.g., mainly for a UE located inside/outside the communication coverage of the base station (and/or in the RRC_CONNECTED/RRC_IDLE state)). As used herein, the term "sensing operation" may be interpreted as a PSSCH-RSRP measurement operation based on a PSSCH demodulation reference signal (DM-RS) sequence (scheduled through a PSCCH successfully decoded) and/or an S-RSSI measurement operation (based on a V2X resource pool-related subchannel). The term "reception" may be (extensively) interpreted as at least one of (A) an operation of decoding (/receiving) a V2X channel (/signal) (e.g., a PSCCH, a PSSCH, a PSBCH, or a PSSS/SSSS) (and/or an operation of decoding (/receiving) a wide area network (WAN) downlink (DL) channel (/signal), for example, a PDCCH, a PDSCH, or a PSS/SSS), (B) a sensing operation, and/or (C) a CBR measurement operation. The term "transmission" may be (extensively) interpreted as an operation of transmitting a V2X channel (/signal) (e.g., a PSCCH, a PSSCH, a PSBCH, or a PSSS/SSSS) (and/or an operation of transmitting a WAN uplink (UL) channel (/signal), for example, a PUSCH, a PUCCH, or an SRS). The term "carrier" may be (extensively) interpreted as (A) a carrier set (/group) configured (/signaled) in advance and/or (B) a V2X pool. Here, a PSSCH-RSRP, an S-RSSI, a CBR, and a CR may be defined as described above.

Hereinafter, abbreviations used herein are specified.

L-TTI: means an operation based on an existing (legacy) length of 1 ms (or a greater number of symbols than those in an S-TTI).

L-TTI Transmission (TX): means channel/signal transmission based on an L-TTI.

S-TTI: means an operation based on a smaller number of symbols than those in an L-TTI.

S-TTI Transmission (TX): means channel/signal transmission based on an S-TTI.

S-PSCCH, S-PSSCH: mean a PSCCH and a PSSCH based on an S-TTI.

L-PSCCH, L-PSSCH: mean a PSCCH and a PSSCH based on an L-TTI.

The following aspect may be taken into consideration.

The PSCCH/PSSCH decoding capability of an existing (Rel-14) V2X UE based on an L-TTI is defined as follows.

{X=10, Y=100}, {X=20, Y=136}

Herein, X and Y may have the following meanings.

Herein, for example, a UE is not expected to attempt to decode more than X PSCCH(s) in a subframe. A UE is able to decode up to X PSCCH(s) in a subframe.

Herein, for example, a UE is expected to attempt to decode at least Y RB(s) per subframe counting both PSCCH and PSSCH decoding RB(s).

In the same resource pool, when an L-TTI-based (Rel-15/14) V2X UE (hereinafter, "L-UE") and am S-TTI-based (Rel-15) V2X UE (hereinafter, "S-UE") coexist, a mechanism may be needed for the (Rel-15) V2X having a restricted capability (e.g., having a finite maximum number of (candidate) PSCCHs on which the UE attempts blind decoding (BD) (or a finite maximum number of PSCCHs that the UE can decode) within an (existing) L-TTI (e.g., 1 ms)) to properly divide the finite maximum number for S-PSCCHs and L-PSCCHs. This mechanism may be, for example, for mitigating (preventing) an increase in UE implementation complexity or for enabling the efficient coexistence of an L-UE and an S-UE (in the same resource pool). As used herein, the term "PSCCH" may be (restrictively) interpreted, for example, as an S-PSCCH (and/or an L-PSCCH).

That is, in a next-generation wireless communication system, in a V2X resource pool in which a UE performing an L-TTI-based V2X operation and a UE performing an S-TTI-based V2X operation coexist, there may be a case where a UE needs to perform blind decoding on an L-TTI-based PSCCH and an S-TTI-based PSCCH at the same time. Here, for example, the maximum number of times the UE can perform (PSCCH-related) blind decoding within a time period of one L-TTI or the maximum number of PSCCHs that the UE can decode within a time period of one L-TTI may be determined on the basis of a capability of the UE as described above. In this case, a method for properly dividing the number of blind decoding times for each of an L-TTI-based PSCCH and an S-TTI-based PSCCH is required for the efficient coexistence of the UEs in the resource pool in which the UEs coexist. This method is particularly efficient when the UE has a restricted blind decoding capability.

Therefore, proposed below is a PSCCH blind decoding method of a UE based on the division or control of the number of blind decoding times for each of an L-TTI-based PSCCH and an S-TTI-based PSCCH in view of the foregoing requirement.

Figure 12:
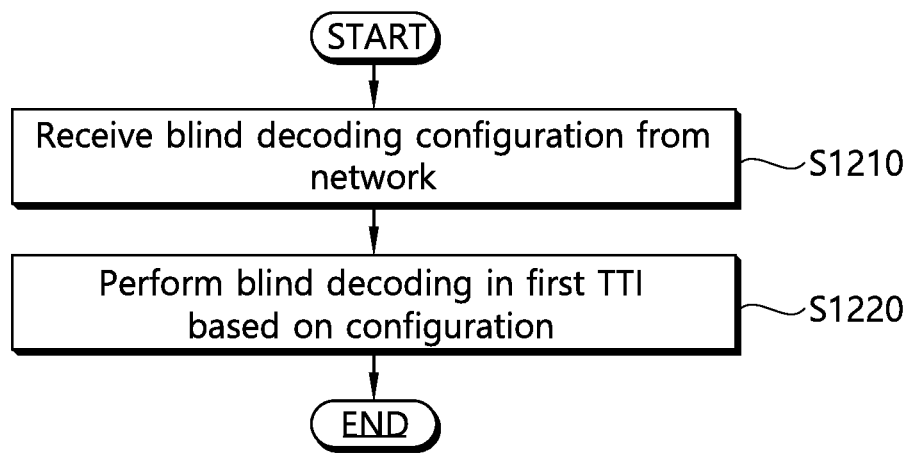
FIG. 12 is a flowchart illustrating a method for a UE to perform blind decoding of a PSCCH according to an embodiment of the disclosure.

FIG. 12 is a flowchart illustrating a method for a UE to perform blind decoding of a PSCCH according to an embodiment of the disclosure.

Referring to FIG. 12, a UE receives a blind decoding configuration from a network (S1210).

The UE performs blind decoding in a first TTI on the basis of the configuration (S1220). Here, the blind decoding may include first blind decoding for a first PSCCH based on the first TTI and second blind decoding for a second PSCCH based on a second TTI shorter than the first TTI. The configuration may be used to control at least one of the number of times the UE performs the first blind decoding in the first TTI and the number of times the UE performs the second blind decoding in the first TTI.

In a resource pool configured for the UE, a first UE performing a sidelink operation based on the first TTI and a second UE for performing a sidelink operation based on the second TTI may coexist.

The configuration may indicate the minimum number of times the UE performs the second blind decoding.

The configuration may be resource pool-specific.

The UE may have a restricted blind decoding capability.

The configuration may indicate a division ratio between the number of times the UE performs the first blind decoding and the number of times the UE performs the second blind decoding.

The blind decoding may be performed on a first carrier, and the blind decoding may be performed by adding the number of blind decoding times that can be performed on a second carrier.

The added number may be controlled by the network.

The added number may be the remaining number of blind decoding times corresponding to the number of blind decoding times allocated for the second carrier excluding the number of blind decoding times required in a resource pool for the second carrier.

The number of blind decoding times allocated for the second carrier may be greater than the number of blind decoding times required in the resource pool for the second carrier.

The number of carriers simultaneously monitored by the UE may be determined on the basis of the added number.

The UE may transmit capability information about the blind decoding to the network.

The configuration may be set on the basis of the capability information.

The capability information may include the maximum number of times the UE can perform the blind decoding on a plurality of carriers within the first TTI.

The configuration may be set differently according to at least one of a congestion level, a carrier priority, or a UE type.

Hereinafter, the method proposed in the disclosure will be described in more detail.

(Rule #A) (In a resource pool in which an L-UE and an S-UE coexist) A (Rel-15) V2X UE having a restricted PSCCH decoding capability can divide the capability for S-PSCCHs and L-PSCCHs according to (some of) the following rules (for convenience of description, the capability of the UE is referred to as "TOTAL_BD-NUM" within a (reference) TTI length (e.g., L-TTI (1 ms)) (referred to as "CAPA_REFTTI") configured (/signaled) in advance).

Herein, for example, "the minimum (/maximum) required number (/ratio) of S-PSCCH (or L-PSCCH) BD (/decoding) times" (of TOTAL_BDNUM) may be configured (/signaled) by a network within CAPA_REFTTI (e.g., L-TTI (1 ms)) (e.g., the minimum (/maximum) required number (/ratio) may be regarded as the minimum (/maximum) requirement necessary for the coexistence of the L-UE/S—in the same resource pool).

Herein, for example, the remaining number (/ratio) of BD (/decoding) times other than the minimum required number (/ratio) may be interpreted as being managed (/allocated) by the UE.

Herein, for example, "the division ratio (/value) in the number of BD (/decoding) times between S-PSCCHs and L-PSCCHs" (of TOTAL_BDNUM) may be configured (/signaled) by a network within CAPA_REFTTI (e.g., different values may be actually allocated for S-PSCCH/L-PSCCH BD (/decoding) according to TOTAL_BDNUM).

Herein, for example, information related to (Rule #A) may be configured (/signaled) in a "resource pool-specific" (or "carrier-specific") manner.

That is, as described above, to efficiently divide the number of PSCCH blind decoding times, the UE may receive a blind decoding configuration from the network and may perform blind decoding on the basis of the received configuration. Here, the blind decoding configuration may indicate the minimum number of times blind decoding for an S-TTI-based PSCCH needs to be performed. Alternatively, the blind decoding configuration may indicate a division ratio between the number of blind decoding times for an S-TTI-based PSCCH and the number of blind decoding times for an L-TTI-based PSCCH. Here, the configuration may be a resource pool-specific configuration. This method enables, for example, a Rel-15 UE to efficiently perform collision avoidance in view of an existing UE (e.g., a Rel-14 UE).

(Rule #B) The number (/ratio) of particular carrier-related PSCCH BD (/decoding) times is borrowed for performing (additional)S-PSCCH (or L-PSCCH) BD (/decoding) in another carrier-related (L-UE/S-UE coexisting) resource pool, (some of) the following may be applied.

Herein, for example, "the maximum (/minimum) number (/ratio) of BD (/decoding) times that can be borrowed between inter-carriers (or carrier pairs)" may be configured (/signaled) by a network (e.g., the maximum (/minimum) number (/ratio) may be differently designated per "subframe set" configured (/signaled) in advance).

Herein, for example, borrowing the number of BD (/decoding) times may be restrictively performed (/allowed) between PSCCHs of the same (TTI) type (/kind).

Herein, for example, borrowing the number of PSCCH BD (/decoding) times from a particular carrier may be allowed only when the number of times PSCCH BD (/decoding) actually needs to be performed in a resource pool related to the carrier is smaller than the number of PSCCH BD (/decoding) times allocated (in advance) for the carrier (e.g., "the total number of carriers monitored (/received) by the TOTAL_BDNUM/UE") (e.g., the number of PSCCH BD (/decoding) times actually required may vary depending on the number of subchannels included in the resource pool).

Herein, for example, in applying (Rule #B), the number of carriers that a V2X UE can simultaneously monitor (/receive) may be interpreted as changing (/being restricted) according to the level of borrowing the number of BD (/decoding) times between inter-carriers (or carrier pairs) (or according to whether BD (/decoding) of an S-PSCCH/BD (/decoding) of an L-PSCCH are simultaneously performed on a particular carrier).

The blind decoding capability of the UE may be determined to be the maximum number of times that the UE can perform blind decoding on an inter-carrier within one TTI (e.g., one L-TTI). Here, a method of increasing the number of blind decoding times for a particular carrier by adding the number of blind decoding times allocated for other carriers to the number of times the UE performs blind decoding for the particular carrier through the control of the network may be taken into consideration.

The added number may exist only when the number of times PSCCH blind decoding actually needs to be performed in a resource pool for the other carriers is smaller than the number of PSCCH blind decoding times allocated to the other carriers. That is, the number of PSCCH blind decoding times allocated for the other carriers may be greater than the number of times PSCCH blind is actually performed on the other carriers.

Figure 13:
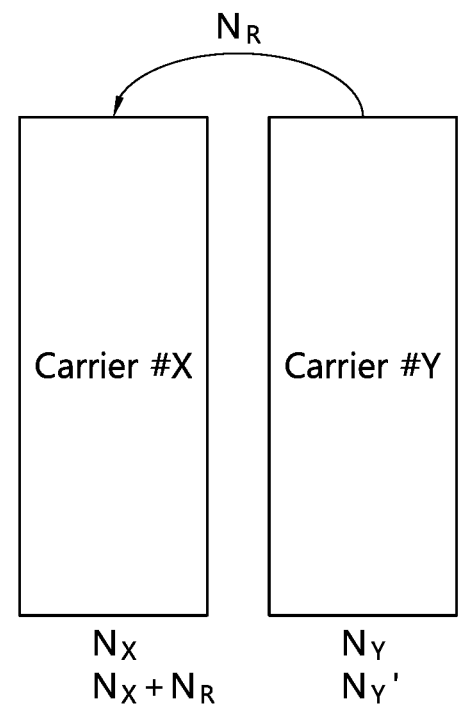
FIG. 13 schematically illustrates an example of a method for a UE to perform PSCCH blind decoding according to Rule #B.

FIG. 13 schematically illustrates an example of a method for a UE to perform PSCCH blind decoding according to Rule #B.

FIG. 13 shows carrier #X and carrier #Y allocated to a V2X UE. Here, for example, the maximum number of times the UE can perform blind decoding for carrier #X and carrier #Y in one L-TTI may be C. That is, the blind decoding capability of the UE may correspond to C across the carriers. For example, the number of blind decoding times allocated for carrier #X may be Nx, and the number of blind decoding times allocated for carrier #Y may be Ny. Here, Nx+Ny=C.

Here, the number of times blind decoding actually needs to be performed in carrier #Y may be Ny'. When Ny is greater than Ny', blind decoding may be performed $N_R$ times in carrier #X. Here, $N_Y-N_Y'=N_R$. As described above, even though the number of times blind decoding is actually performed (per carrier) is different, the maximum number of times the UE can perform blind decoding for carrier #X and carrier #Y in one L-TTI is C, and thus blind decoding may be performed within the blind decoding capability range of the UE.

According to the foregoing method, blind decoding can actually be performed in carrier #X a greater number of times than the allocated number of blind decoding times, thus making it possible to efficiently control/share the number of PSCCH blind decoding times. This method may be more effective when an L-TTI-based V2X UE and an S-TTI-based V2X UE coexist in a V2X resource pool for carrier #X.

(Rule #C) When a V2X UE reports a PSCCH decoding capability (to a base station), (some of) the following may be applied.

Herein, for example, the V2X UE can report "the maximum number of PSCCH BD (/decoding) times" that can be supported within "per CAPA_REFTTI" "across carriers" (or "per carrier") (or (number) information about carriers (/bands) that the V2X UE can support).

Herein, for further example, the "maximum number" information (reported by the UE) may be (independently or separately) reported by different TTI types (e.g., S-PSCCH and L-PSCCH).

Herein, for further example, a base station (or network) receiving the information (e.g., "across carriers") may configure (/signal) Rule #A/Rule #B-related information/ whether to apply Rule #A/Rule #B (e.g., the minimum required number (/ratio) of S-PSCCH (or L-PSCCH) BD (/decoding) times, the division ratio in the number of BD (/decoding) times between S-PSCCHs and L-PSCCHs, or the like), or allocation information about the number of PSCCH BD (/decoding) times (regardless of S-PSCCHs/L-PSCCHs) in a "carrier (/pool)-specific" manner (e.g., since the number of times the UE actually needs to perform PSCCH BD (/decoding) on a particular carrier or the kind (/type) of a PSCCH may vary per carrier depending on (1) the number of subchannels included in a resource pool or (2) whether an L-UE and an S-UE coexist in a resource pool).

That is, the UE may transmit capability information of the UE relating to the maximum number of times the UE can perform PSCCH blind decoding within one TTI (e.g., one L-TTI) to the network. Here, the capability information may be information about the number of PSCCH blind decoding times of the UE for a plurality of carriers. The network receiving the information may determine the number of PSCCH blind decoding times to be carrier-specific in a blind decoding configuration to be transmitted to the UE.

Figure 14:
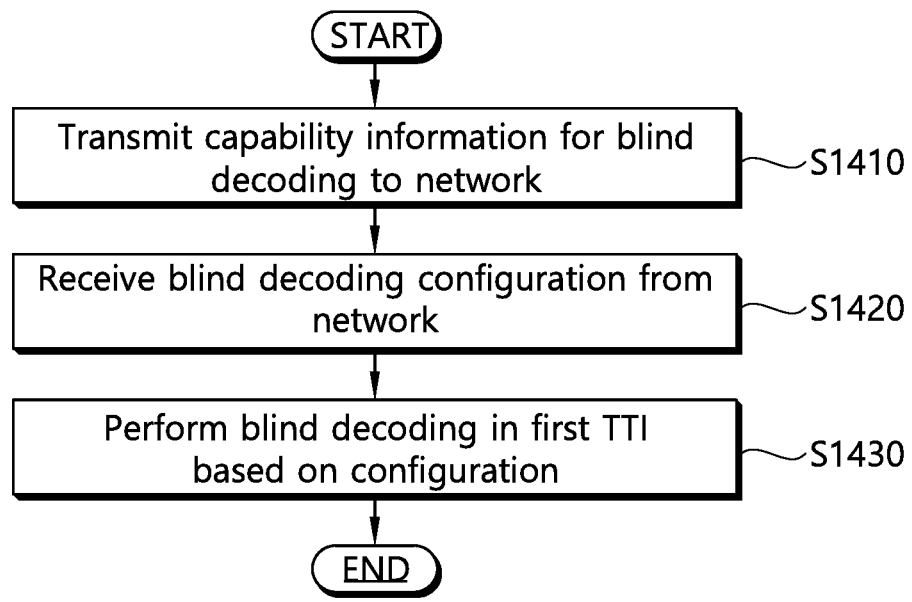
FIG. 14 is a flowchart illustrating a method for a UE to perform blind decoding of a PSCCH according to another embodiment of the disclosure.

FIG. 14 is a flowchart illustrating a method for a UE to perform blind decoding of a PSCCH according to another embodiment of the disclosure.

Referring to FIG. 14, a UE transmits capability information about blind decoding to a network (S1410).

The UE receives a blind decoding configuration from the network (S1420). The blind decoding configuration may be set on the basis of the capability information.

The UE performs blind decoding in a first TTI on the basis of the configuration (S1430).

Although FIG. 14 illustrates an example in which a UE transmits capability information about blind decoding to a network and then receives a blind decoding configuration from the network, the disclosure is not necessarily limited thereto.

In addition, the following method may be considered.

According to the parameter (/condition) below, information related to (some of) the rules (e.g., the minimum required number (/ratio) of S-PSCCH (or L-PSCCH) blind decoding (/decoding) times, the division ratio in the number of blind decoding (/decoding) times between an S-PSCCH and an L-PSCCH, or the maximum (/minimum) number (/ratio) of blind decoding (/decoding) times borrowed between inter-carriers (or carrier pairs)) or whether to apply (some of) the rules may be differently configured (/signaled) (e.g., the information may be configured (/signaled) in a resource pool-specific (or carrier-specific) manner).

The parameter may be a congestion level (or a CRB (/CR), a CR limit, or the maximum allowed transmission power value).

The parameter may be, for example, a carrier (/service) priority (or a carrier type, e.g., an anchor carrier, (e.g., a carrier for basic reception (/transmission)), or a synchronization reference carrier).

The parameter may be, for example, a UE type (/kind, e.g., a vehicle-UE (V-UE) or a pedestrian-UE (P-UE)).

Here, for example, in the case of a P-UE requiring relatively low (implementation) complexity and low power consumption, (A) an operation of performing simultaneous blind decoding (/decoding) of an S-PSCCH and an L-PSCCH or (B) an S-TTI transmission (TX) (/reception (RX)) operation may not be required (/configured).

The parameter may be, for example, the ProSe priority per packet (PPPP) (/latency/reliability requirement) value of a (TX/RX) (V2X) packet.

Whether to apply (some of) the rules or the related information may be: (A) transmitted from a particular (TX) UE to another UE through predefined signaling (e.g., a PSCCH (/PSSCH), a PSDCH, an SIB (/RRC), or the like); or (B) (pre)configured by the network for UEs. The (pre)configuration may be performed in a pool (/carrier)-specific manner.

(Some of) The rules may be restrictively applied to a (Rel-15) V2X UE having an S-TTI RX (/TX) (and/or L-TTI RX (/TX)) capability (or a (Rel-15) V2X UE (currently) performing S-TTI TX (/RX) (and/or L-TTI TX (/RX)).

- (Some of) The rules may be restrictively applied only when a UE (actually) detects another UE based on a different TTI type (/kind) (or a plurality of TTI types) (in an L-UE/S-UE-coexisting) resource pool) (or only in an L-UE/S-UE-coexisting) resource pool).
- (Some of) The rules may be used in an extended manner for a V2X UE having a restricted PSSCH decoding capability to efficiently divide/manage the decoding capability for an S-PSSCH and an L-PSSCH.

That is, for the efficient coexistence of UEs in a resource pool, the foregoing blind decoding configuration may vary depending on a congestion level (e.g., a CBR or CR), a carrier or service priority, or a UE type. For example, the blind decoding configuration may vary depending on whether the UE is a vehicle-UE, the type of a different carrier, or the type of a service provided via a different carrier. In addition, the blind decoding configuration may be set, for example, such that a carrier having a relatively high (service) priority may be allocated a greater number of blind decoding times or may have the number of blind decoding times borrowed from that for a different carrier set to be large.

It is obvious that examples of the proposed methods illustrated above may also be included in one method for implementing the disclosure and may thus be regarded as proposed methods. Although the foregoing proposed methods may be independently implemented, some thereof may be combined (or merged) for implementation.

For example, although the disclosure has illustrated the proposed methods on the basis of a 3GPP LTE system for convenience of description, the range of systems to which the proposed methods are applied may be extended to other systems in addition to the 3GPP LTE system.

In one example, the proposed methods of the disclosure may extend to D2D communication.

Here, for example, D2D communication means that a UE communicates directly with another UE using a wireless channel, where the UE refers to, for example, a user terminal, but a network device, such as a base station, which transmits/receives a signal according to a communication mode between UEs may also be considered as a type of UE.

The proposed methods of the disclosure may be restrictively applied only to a MODE #3 V2X operation (and/or MODE #4 V2X operation).

The proposed methods of the disclosure may be restrictively applied only to (particular) V2X channel (/signal) transmission configured (/signaled) in advance (e.g., a PSSCH (and/or (interlinked) PSCCH and/or PSBCH).

The proposed methods of the disclosure may be restrictively applied only when a PSSCH and a (interlinked) PSCCH are transmitted adjacently (and/or non-adjacently) (in the frequency domain) (and/or when transmission is performed on the basis of a modulation and coding scheme (MCS) configured (/signaled) in advance (and/or a coding rate and/or RB value (/range))).

The proposed methods of the disclosure may be restrictively applied only to a MODE #3 (and/or a MODE #4) V2X carrier (and/or a (MODE #4 (/3) SL (/UL) semi-persistent scheduling (SPS) (and/or SL (/UL) dynamic scheduling) carrier).

The proposed methods of the disclosure may be (restrictively) applied only when carriers have the positions and/or the number of synchronization signal (TX (and/or RX)) resources (and/or the positions and/or the number of V2X resource pool related subframes (and/or the sizes and/or the number of subchannels)) that are the same (and/or (partially) different).

Figure 15:
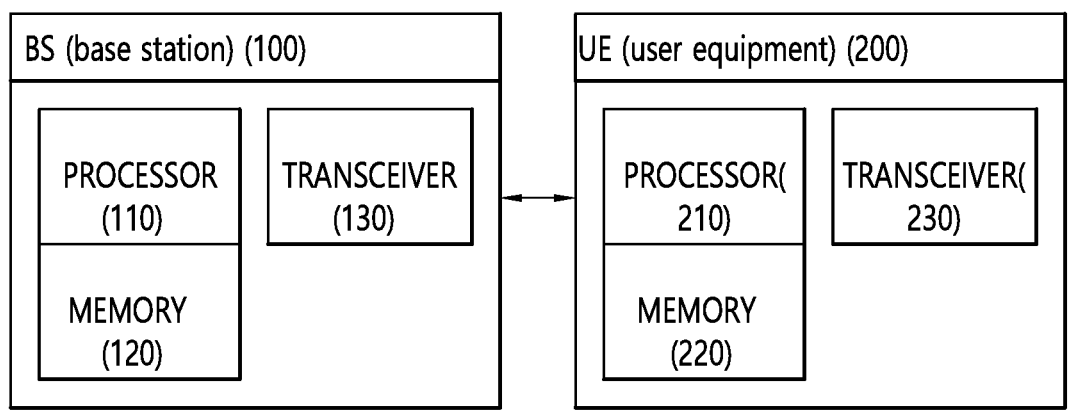
FIG. 15 is a block diagram illustrating a communication device according to an embodiment of the disclosure.

FIG. 15 is a block diagram illustrating a communication device according to an embodiment of the disclosure.

Referring to FIG. 15, a base station 100 includes a processor 110, a memory 120, and a transceiver 130. The processor 110 implements the proposed functions, processes, and/or methods. The memory 120 is connected to the processor 110 and stores various pieces of information to drive the processor 110. The transceiver 130 is connected to the processor 110 and transmits and/or receives a radio signal.

A UE 200 includes a processor 210, a memory 220, and a transceiver 230. The processor 110 implements the proposed functions, processes, and/or methods. The memory 220 is connected to the processor 210 and stores various pieces of information to drive the processor 210. The transceiver 230 is connected to the processor 210 and transmits and/or receives a radio signal. The UE 200 may perform D2D operation to another UE according to the foregoing methods.

The processor 110 and 210 may include an application-specific integrated circuit (ASIC), another chip set, a logical circuit, a data processing device, and/or a converter converting a baseband signal and a radio signal to and from one another. The memory 120 and 220 may include a read-only memory (ROM), a random access memory (RAM), a flash memory, a memory card, a storage medium, and/or another storage device. The transceiver 130 and 230 may include one or more antennas transmitting and/or receiving radio signals. When the embodiments are implemented as software, the above-described methods may be implemented as a module (process, function, and so on) performing the above-described functions. The module may be stored in the memory 120 and 220 and may be executed by the processor 110 and 210. The memory 120 and 220 may be located inside or outside of the processor 110 and 210 and may be connected to the processor 110 and 210 through a diversity of well-known means.

Figure 16:
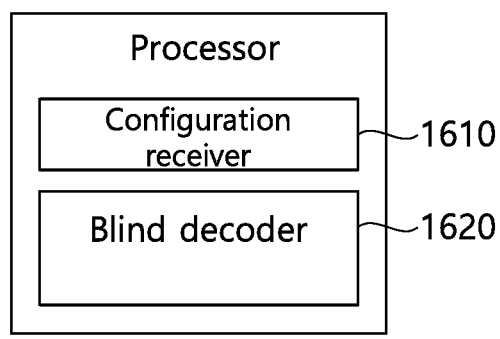
FIG. 16 is a block diagram illustrating an example of a device included in a processor.

FIG. 16 is a block diagram illustrating an example of a device included in a processor.

Referring to FIG. 16, the processor may include a configuration receiver 1610 and a blind decoder 1620 in terms of functionality. Here, the processor may be the processor 110 and 210 in FIG. 15.

The configuration receiver may have a function of receiving a blind decoding configuration from a network. The blind decoder may have a function of performing blind decoding within a first TTI on the basis of the configuration.

The device included in the processor described above is merely an example, and the processor may further include other function elements or devices. A specific example of an operation performed by each functional device described above is substantially the same as described above, and thus a redundant description is omitted herein.

What is claimed is:

1. A method for performing blind decoding of a physical sidelink control channel (PSCCH) in a wireless communication system, the method performed by a user equipment (UE) and comprising:
  receiving a blind decoding configuration from a network; and
  performing blind decoding in a first transmission time interval (TTI) based on the configuration,
    wherein the blind decoding comprises first blind decoding for a first PSCCH based on the first TTI and second blind decoding for a second PSCCH based on a second TTI shorter than the first TTI, and the configuration is used to control at least one of a number of times the UE performs the first blind decoding in the first TTI and a number of times the UE performs the second blind decoding in the first TTI.

2. The method of claim 1, wherein in a resource pool configured for the UE, a first UE performing a sidelink operation based on the first TTI and a second UE performing a sidelink operation based on the second TTI coexist.

3. The method of claim 1, wherein the configuration informs a minimum number of times the UE performs the second blind decoding.

4. The method of claim 1, wherein the configuration is resource pool-specific.

5. The method of claim 1, wherein the UE has a restricted blind decoding capability.

6. The method of claim 1, wherein the configuration informs a division ratio between a number of times the UE performs the first blind decoding and a number of times the UE performs the second blind decoding.

7. The method of claim 1, wherein the blind decoding is performed on a first carrier, and the blind decoding is performed by adding a number of blind decoding times that can be performed on a second carrier.

8. The method of claim 7, wherein the added number is controlled by the network.

9. The method of claim 7, wherein the added number is a remaining number of blind decoding times related to a number of blind decoding times allocated for the second carrier excluding a number of blind decoding times required in a resource pool for the second carrier.

10. The method of claim 9, wherein the number of blind decoding times allocated for the second carrier is greater than the number of blind decoding times required in the resource pool for the second carrier.

11. The method of claim 7, wherein a number of carriers simultaneously monitored by the UE is determined based on the added number.

12. The method of claim 1, wherein the UE transmits capability information about the blind decoding to the network.

13. The method of claim 12, wherein the configuration is set based on the capability information.

14. The method of claim 12, wherein the capability information comprises a maximum number of times the UE can perform the blind decoding on a plurality of carriers within the first TTI.

15. The method of claim 1, wherein the configuration is set differently according to at least one of a congestion level, a carrier priority, or a UE type.

16. A user equipment (UE) comprising:
a transceiver configured to transmit and receive a radio signal; and
a processor configured to be connected with the transceiver and to operate,
wherein the processor is configured to:
receive a blind decoding configuration from a network; and
perform blind decoding in a first transmission time interval (TTI) based on the configuration,
the blind decoding comprises first blind decoding for a first PSCCH based on the first TTI and second blind decoding for a second PSCCH based on a second TTI shorter than the first TTI, and
the configuration is used to control at least one of a number of times the UE performs the first blind decoding in the first TTI and a number of times the UE performs the second blind decoding in the first TTI.

17. The user equipment of claim 16, wherein the UE communicates with at least one of a mobile terminal, a network or autonomous vehicles other than the UE.

* * * * *